United States Patent
Akatsuka et al.

(10) Patent No.: US 12,379,732 B2
(45) Date of Patent: Aug. 5, 2025

(54) REMOTE DRIVING METHOD, REMOTE DRIVING DEVICE AND COMPUTER-READABLE MEDIUM

(71) Applicant: TOYOTA JIDOSHA KABUSHIKI KAISHA, Toyota (JP)

(72) Inventors: Kosuke Akatsuka, Mishima (JP); Rio Suda, Toyota (JP); Hirofumi Momose, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/520,749

(22) Filed: Nov. 28, 2023

(65) Prior Publication Data

US 2024/0210953 A1    Jun. 27, 2024

(30) Foreign Application Priority Data

Dec. 23, 2022  (JP) .................... 2022-206112

(51) Int. Cl.
  *G05D 1/65*    (2024.01)
  *G05D 1/224*   (2024.01)
  G05D 109/10    (2024.01)
  G05D 111/50    (2024.01)

(52) U.S. Cl.
  CPC ............. *G05D 1/2247* (2024.01); *G05D 1/65* (2024.01); *G05D 2109/10* (2024.01); *G05D 2111/58* (2024.01)

(58) Field of Classification Search
  CPC .... G05D 1/2247; G05D 1/65; G05D 2109/10; G05D 2111/58
  See application file for complete search history.

(56) References Cited

U.S. PATENT DOCUMENTS

| | | |
|---|---|---|
| 11,215,982 B2 | 1/2022 | Urano et al. |
| 11,325,618 B2 | 5/2022 | Umeda |
| 2019/0137999 A1 | 5/2019 | Taguchi et al. |
| 2020/0209888 A1 | 7/2020 | Sakai et al. |
| 2020/0326702 A1 | 10/2020 | Iwamoto et al. |
| 2021/0039680 A1 | 2/2021 | Kindo et al. |
| 2021/0041894 A1 | 2/2021 | Urano et al. |
| 2021/0055741 A1 | 2/2021 | Kawanai et al. |
| 2021/0058173 A1 | 2/2021 | Otaki et al. |
| 2021/0072743 A1 | 3/2021 | Otaki et al. |
| 2021/0080943 A1 | 3/2021 | Iwamoto et al. |
| 2023/0324903 A1* | 10/2023 | Kim ................. G05D 1/223 |
| 2024/0302845 A1* | 9/2024 | Miyashita ........ G06Q 10/063 |

FOREIGN PATENT DOCUMENTS

JP    2021-026558 A    2/2021

* cited by examiner

*Primary Examiner* — Mathew Franklin Gordon
(74) *Attorney, Agent, or Firm* — Sughrue Mion, PLLC

(57) ABSTRACT

A method for a remote driving of a mobile vehicle having wheels is provided. The method comprises the steps of: accepting a start request for the remote driving; acquiring information on a target steering angle of the wheels generated in a remote driving device and information on an actual steering angle of the wheels; and permitting a start of the remote driving including a remote steering of the wheels based on the target steering angle when the start request is accepted and the target steering angle and the actual steering angle match.

17 Claims, 10 Drawing Sheets

REMOTE DRIVING METHOD, REMOTE DRIVING DEVICE AND COMPUTER-READABLE MEDIUM

CROSS-REFERENCE TO RELATED APPLICATION

The present application claims priority under 35 U.S.C. § 119 to Japanese Patent Application No. 2022-206112, filed on Dec. 23, 2022, the contents of which application are incorporated herein by reference in their entirety.

TECHNICAL FIELD

The present disclosure relates to a method and a device for remote driving of a mobile vehicle and a computer-readable storage medium.

BACKGROUND

JP2021-026558A discloses a method for taking over from a driving operation of a vehicle by a first driver to that of the vehicle by a second driver. The first driver is a driver who takes a ride in the vehicle or an operator who remotely drives the vehicle. When the first driver is a driver of the vehicle, the second driver is an operator of the vehicle. When the first driver is an operator of the vehicle, the second driver may be another operator of the vehicle.

Consider a case where a driving operation of a mobile vehicle with wheels represented by the vehicle is taken over by an operator. In this case, a deviation between a steering angle of the mobile vehicle and that of a remote driving device gives feeling of strangeness to the operator who intends to start the remote driving. In this regard, if an alignment is performed to match the steering angle of the remote driving device with that of the mobile vehicle, and a handover to the remote driving is performed after this alignment, it is expected to lead to elimination of such feeling of strangeness.

However, in the method of performing the takeover after the alignment, when the steering wheel of the remote driving device moves in the middle of the takeover to the remote driving, there is a concern that the alignment needs to be performed again. The re-alignment is cumbersome for the operator and is likely to interfere with the initiation of the remote driving in a short period of time. Therefore, there is room for improvement in a technique for smoothly starting the remote driving.

An object of the present disclosure is to provide a technique capable of smoothly starting the remote driving of the mobile vehicle with wheels.

SUMMARY

A first aspect of the present disclosure is a method for performing remote driving of a mobile vehicle having wheels and has the following features.

The method comprising the step of:
accepting a start request for the remote driving;
acquiring information on a target steering angle of the wheels generated in a remote driving device and information on an actual steering angle of the wheels; and
permitting a start of the remote driving including a remote steering of the wheels based on the target steering angle when the start request is accepted and the target steering angle and the actual steering angle match.

A second aspect of the present disclosure is a device for performing a remote driving of a mobile vehicle having wheels and has the following features.

The device includes a processor.
The processor is configured to execute processing to:
accept a start request for the remote driving;
acquire information on a target steering angle of the wheels generated in the remote driving device and information on an actual steering angle of the wheels; and
permit a start of the remote driving including a remote steering of the wheels based on the target steering angle when the start request is accepted and the target steering angle and the actual steering angle match.

A third aspect of the present disclosure is a non-transitory computer-readable medium storing a program for performing a remote driving of a mobile vehicle having wheels, and has the following features.

The program causes a computer to execute processing to:
accept a start request for the remote driving;
acquire information on a target steering angle of the wheels generated in a demote driving device and information on an actual steering angle of the wheels; and
permit a start of the remote driving including a remote steering of the wheels based on the target steering angle when the start request is accepted and the target steering angle and the actual steering angle match.

According to the present disclosure, when the start request for the remote driving of the mobile vehicle having wheels is accepted and when the target steering angle of the wheels generated in the remote driving device matches the actual steering angle of the wheels, the start of the remote driving including the remote steering of the wheels based on the target steering angle is permitted. That is, according to the present disclosure, a condition that the target steering angle of the wheels generated in the remote driving device matches the actual steering angle of the wheels is used as a final condition for permitting the start of the remote driving. Therefore, it is possible to smoothly start the remote driving of the mobile vehicle by avoiding a situation in which the alignment of the steering wheel repeated before starting the remote driving.

DESCRIPTION OF EMBODIMENT

Figure 1:
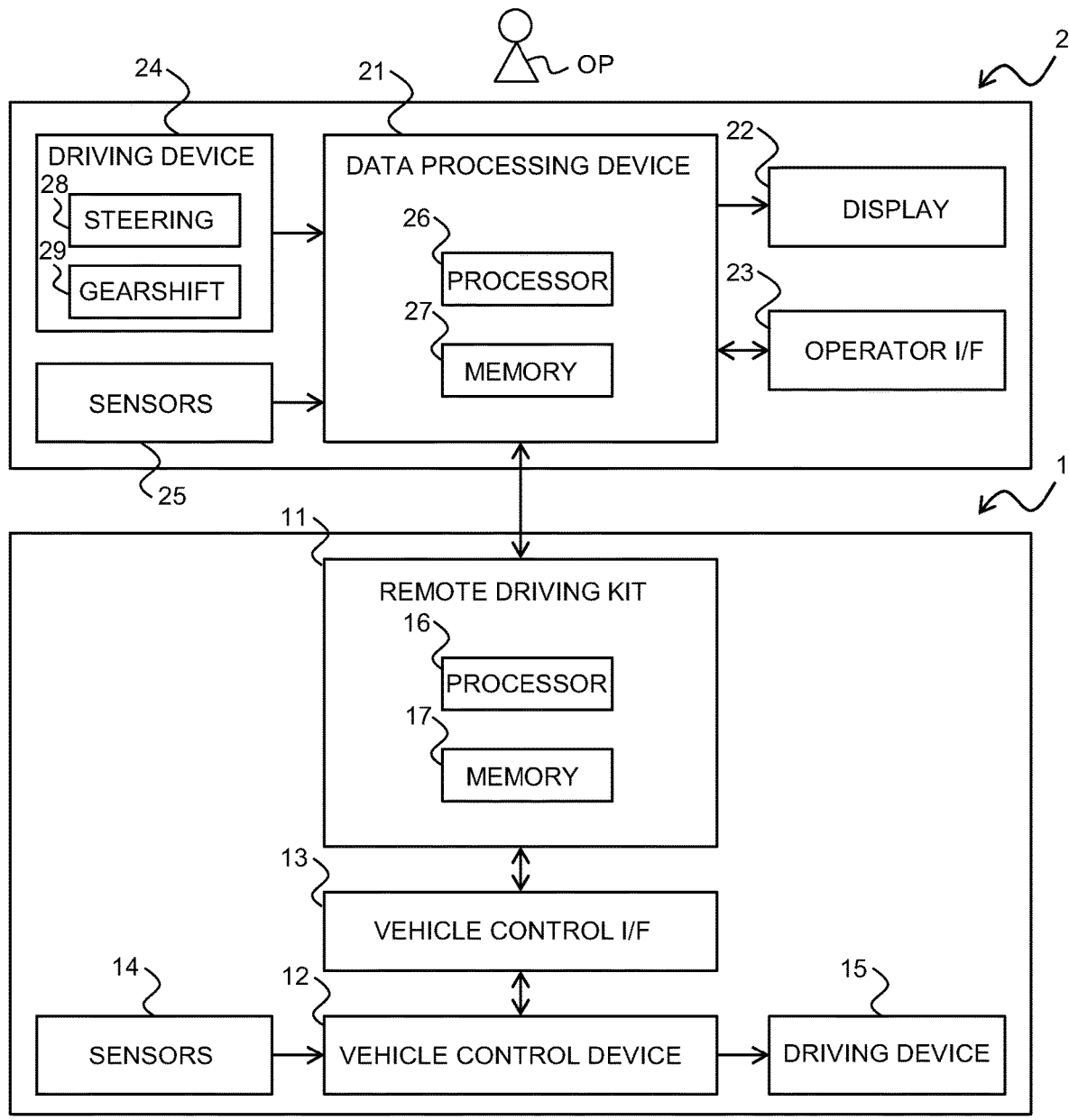
FIG. 1 is a diagram for illustrating an overall configuration example of a system related to a remote driving.

Hereinafter, an embodiment of the present disclosure will be described with reference to the drawings. In the drawings, the same or corresponding parts are denoted by the same reference numerals, and the description thereof will be simplified or omitted.

1. System Configuration Example

FIG. 1 is a diagram illustrating an example of an overall configuration of a system related to a remote driving. In the example illustrated in FIG. 1, a vehicle 1 as a "mobile vehicle" of the present disclosure is driven (i.e., remotely driven) by an operator OP on board a remote cockpit 2 as a "remote driving device" of the present disclosure. The vehicle 1 and the remote cockpit 2 communicate with each other via, for example, a wireless network (not shown) to exchange various data.

In the example shown in FIG. 1, the vehicle 1 includes a remote driving kit 11, a vehicle control device 12, a vehicle control I/F (interface) 13, sensors 14, and a driving device 15. The vehicle 1 is, for example, a vehicle capable of performing an autonomous driving by the vehicle control device 12. The vehicle 1 may be a vehicle that is able to perform a manual driving by a driver of the vehicle 1. In this case, the vehicle control device 12 performs driving control of the vehicle 1 based on various operation amounts that are input from the driver to a driving device (not shown) of the vehicle 1.

The remote driving kit 11 includes at least one processor 16 and at least one memory 17. The processor 16 includes a CPU (Central Processing Unit). The memory 17 is a volatile memory such as a DDR memory, and loads various programs used by the processor 16 and temporarily stores various data. Examples of the various data include various data acquired from the sensors 14. The various programs include a remote driving program according to the embodiment of the present disclosure. An example of processing performed by the processor 16 will be described later.

The remote driving kit 11 communicates with the remote cockpit 2 and exchanges various data with the remote cockpit 2. Examples of various data received by the remote driving kit 11 from the remote cockpit 2 include a start request for the remote driving of the vehicle 1, an instruction for control for the remote driving, and the like. The instruction for the control includes a drive command, a braking command, and a steering command that are required to control the driving device 15 of the vehicle 1. The instruction for the control also includes a command to designate a position of a gearshift lever of the vehicle 1 and a command to operate a driving assistance device such as a headlight, a wiper, or a blinker of the vehicle 1.

Examples of various data transmitted from the remote driving kit 11 to the remote cockpit 2 include an implementation request for the remote driving by the remote cockpit 2 (the operator OP) and data on the driving environment of the vehicle 1. The data related to the driving environment includes internal data such as speed, acceleration (deceleration), and a steering angle of wheels (or a steering angle of a steering wheel) of the vehicle 1, and external data such as a surrounding image including at least a front image of the vehicle 1 and a surrounding sound of the vehicle 1. The external data may include recognition data related to a surrounding object of the vehicle 1 obtained by image processing of the surrounding image or analysis processing of the surrounding sound.

The vehicle control device 12 executes autonomous driving control and travel assist control of the vehicle 1. In the autonomous driving control, for example, the driving device 15 is autonomously controlled based on data on the driving environment of the vehicle 1 that is acquired from the sensors 14. The travel assist control includes control of the driving device 15 based on the instruction for control from the remote driving kit 11. Control of the driving device 15 based on an operation input by the driver of the vehicle 1 is also included in the travel assist control. Hereinafter, in order to distinguish from control, data, and the like related to the remote driving, the word "local" will be appropriately added to data, operation, control, and the like related to the autonomous driving or the manual driving by the driver.

The vehicle control I/F 13 is an interface that connects the remote driving kit 11 and the vehicle control device 12. The operation mode of the vehicle control I/F 13 is switched between two modes by the remote driving kit 11. Specifically, the two modes are a remote operation mode and a local operation mode. When the operation mode is set to the remote operation mode, various data from the remote cockpit 2 is provided to the vehicle control device 12 through the vehicle control I/F 13. On the other hand, when the operation mode is set to the local operation mode, the various data is not provided from the remote cockpit 2.

The sensors 14 include a position sensor, a state sensor, and a recognition sensor. The position sensor acquires position and orientation data of the vehicle 1. Examples of the position sensor include a global navigation satellite system (GNSS) receiver. The state sensor detects speed, acceleration (e.g., longitudinal acceleration and lateral acceleration), yaw rate, an actual steering angle $\delta A$ of the wheels, a steering angle (local steering angle) $\theta L$ of the steering wheel of the vehicle 1 and the like. The recognition sensor recognizes a surrounding situation of the vehicle 1. Examples of the recognition sensor include a camera, a millimeter wave radar, and a Lidar (Light Detection And Ranging). The recognition sensor may include a microphone that acquires ambient sound of the vehicle 1.

The driving device 15 performs acceleration, deceleration, and steering of the vehicle 1. The driving device 15 includes, for example, the wheels, a motor, a steering device, and a brake device. The motor drives the wheels. The steering device steers the wheels. The brake device applies a braking force to the vehicle 1. The acceleration of the vehicle 1 is performed by controlling the motor. The deceleration of the vehicle 1 is performed by controlling the brake device. The braking of the vehicle 1 may be performed using regenerative braking by controlling the motor. The steering of the vehicle 1 is performed by controlling the steering device.

The remote cockpit 2 is a device for performing the remote driving by the operator OP. In the example illustrated in FIG. 1, the remote cockpit 2 includes a data processing device 21, a display 22, an operator I/F (interface) 23, a driving device 24, and sensors 25.

The data processing device 21 includes at least one processor 26 and at least one memory 27. The processor 26 includes a CPU. The memory 27 is a volatile memory such as a DDR memory, and loads various programs used by the processor 26 and temporarily stores various data. The various data includes various data acquired from the sensors 25. An example of the processing executed by the processor 26 will be described later.

The display 22 outputs at least a front image of the vehicle 1 received from the vehicle 1. Peripheral images other than the front image (e.g., images of the sides and the rear of the vehicle 1) may be output to the display 22 together with the front image of the vehicle 1. The display 22 may be composed of two or more displays. In this case, for example, the front image of vehicle 1 is output to a main display, and the surrounding image other than the front image is output to a sub display.

The operator I/F 23 is a HMI (Human Machine Interface) that exchanges information related to the remote driving with the operator OP. The operator I/F 23 includes, for example, a touch panel. The operator OP operates, for example, the touch panel to touch and select one vehicle from a plurality of vehicles serving as candidates for the remote driving. The operator OP also operates the touch panel to touch and select a start request for the remote driving for the selected vehicle. The operator OP further operates the touch panel to touch and select a finish request for the remote driving of the selected vehicle. A series of operation examples using the operator I/F 23 will be described later.

The driving device 24 includes various devices for performing the remote driving. The various devices include at least a steering wheel 28 and a gearshift lever 29. The steering wheel 28 is an example of a "steering member" of the present disclosure. The gearshift lever 29 is an example of a "shift-change member" of the present disclosure. Examples of devices other than the steering wheel 28 and the gearshift lever 29 include an accelerator pedal, a brake pedal, a headlight operation lever, a blinker operation lever, a wiper operation lever, and an ignition switch.

Each of the sensors 25 detects respective operation states of the driving device 24. Examples of the operation state detected by the sensors 25 include at least a steering angle (a remote steering angle) θR of the steering wheel 28 and a position of the gearshift lever 29. Examples of other operation states include a depression amount of an accelerator pedal and a depression amount of a brake pedal.

2. Examples of States of Remote Driving Kit

Figure 2:
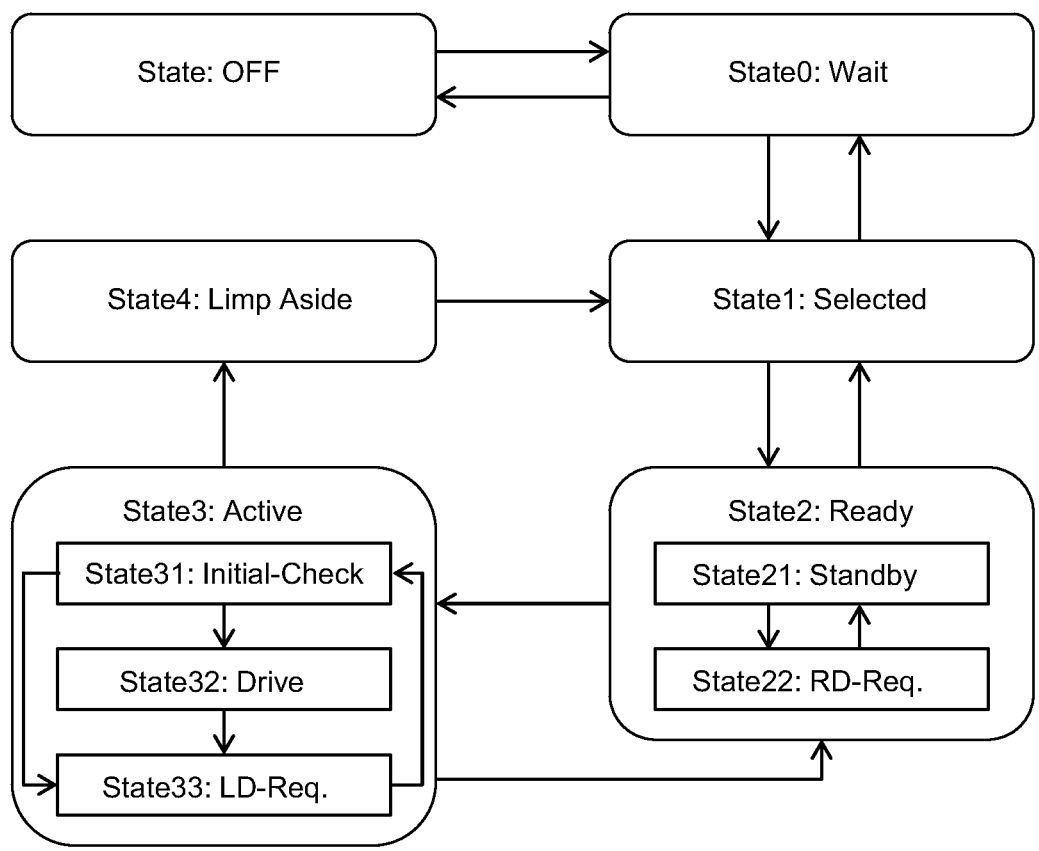
FIG. 2 is a diagram for explaining various states of a remote driving kit shown in FIG. 1 and an example of transition among these states.

FIG. 2 is a diagram illustrating various states of the remote driving kit 11 shown in FIG. 1 and an example of transition among the states. In the example shown in FIG. 2, a state "OFF", a state 0 "Wait", a state 1 "Selected", a state 2 "Ready", a state 3 "Active" and a state 4 "Limp Aside" are shown as the various states.

The state "OFF" indicates a state in which the remote driving kit 11 is not activated. The state 0 "Wait" indicates a state in which the remote driving kit 11 is activated. The transition from the state "OFF" to the state 0 "Wait" occurs, for example, when the remote driving kit 11 receives ON information (IGon) of the ignition switch of the vehicle 1.

The state 1 "Selected" indicates that the remote driving kit 11 is in a connected state with the remote cockpit 2. The transition from the state 0 "Wait" to the state 1 "Selected" occurs, for example, when the remote driving kit 11 receives ON information (DPon information) of the display 22.

Note that, in the state "OFF" and the state 0 "Wait", the operation mode of the vehicle control I/F 13 is set to a local operation mode. When the transition from the state 0 "Wait" to the state 1 "Selected" occurs, the operation mode of the vehicle control I/F 13 is switched from the local operation mode to a remote operation mode. As a result, various data can be exchanged between the remote cockpit 2 and the vehicle control device 12 via the vehicle control I/F 13. However, the remote driving itself is not started. Therefore, for example, the front image of the vehicle 1 received from the vehicle control device 12 is output to the display 22, while the various data for the remote driving received by the remote driving kit 11 from the remote cockpit 2 is discarded by the remote driving kit 11.

The state 2 "Ready" indicates a state in which the remote driving kit 11 is normal and an implementation of the remote driving is permitted. Here, a "permission to perform the remote driving" means a permission in a broad sense, and the start of the remote driving is not permitted. The transition from the state 1 "Selected" to the state 2 "Ready" occurs, for example, when the remote driving kit 11 is determined to be normal by a self-determination of the remote driving kit 11.

The state 2 "Ready" includes a state 21 "Standby" and a state 22 "RD-Req.". The difference between the former and the latter lies in whether the remote driving kit 11 accepts the start request for the remote driving of the vehicle 1. That is, before the remote driving kit 11 accepts the start request for the remote driving, the state of the remote driving kit 11 is in the state 21 "Standby". On the other hand, after the remote driving kit 11 accepts the start request for the remote driving, a transition occurs from the state 21 "Standby" to the state 22 "RD-Req.".

After the remote driving kit 11 accepts the start request for the remote driving, for example, a predetermined authentication processing is executed. After completion of the authentication processing, a transition occurs from the state 2 "Ready" (more precisely, the state 22 "RD-Req.") to the state 3 "Active". The state 3 "Active" indicates an implementation state of the remote driving. The state 3 "Active" includes a state 31 "Initial-Check", a state 32 "Drive", and a state 33 "LD-Req."

The difference between the state 31 "Initial-Check" and the state 32 "Drive" is whether an alignment of the steering wheel has been completed. Here, the "the alignment of the steering wheel" is an operation of the steering wheel 28 for matching a target steering angle δTR of the wheels calculated from the steering angle θR of the steering wheel 28 with an actual steering angle δA of the wheels. Before the alignment is completed, the state of the remote driving kit 11 is in the state 31 "Initial-Check". When the alignment is completed, a transition occurs from the state 31 "Initial-Check" to the state 32 "Drive".

When the remote driving kit 11 accepts a finish request for the remote driving of the vehicle 1, a transition occurs from the state 32 "Drive" to the state 33 "LD-Req.". The "finish request for the remote driving" has the same meaning as requesting the driver to perform the local driving. The transition to the state 33 "LD-Req." can also occur from the state 31 "Initial-Check". A transition in a direction opposite to this transition direction can also occur.

The state 4 "Limp Aside" indicates a state in which the remote driving kit 11 is abnormal. For example, when an abnormality occurs in the remote driving kit 11, or when an abnormality occurs in a communication with the remote cockpit 2, the state 3 "Active" transitions to the state 4 "Limp Aside". When an abnormality occurs in a vehicle-side system such as the vehicle control device 12 and the sensors 14, the transition from the state 3 "Active" to the state 4 "Limp Aside" occurs.

3. Example to Start Remote Driving 3-1. Outline

Figure 3:
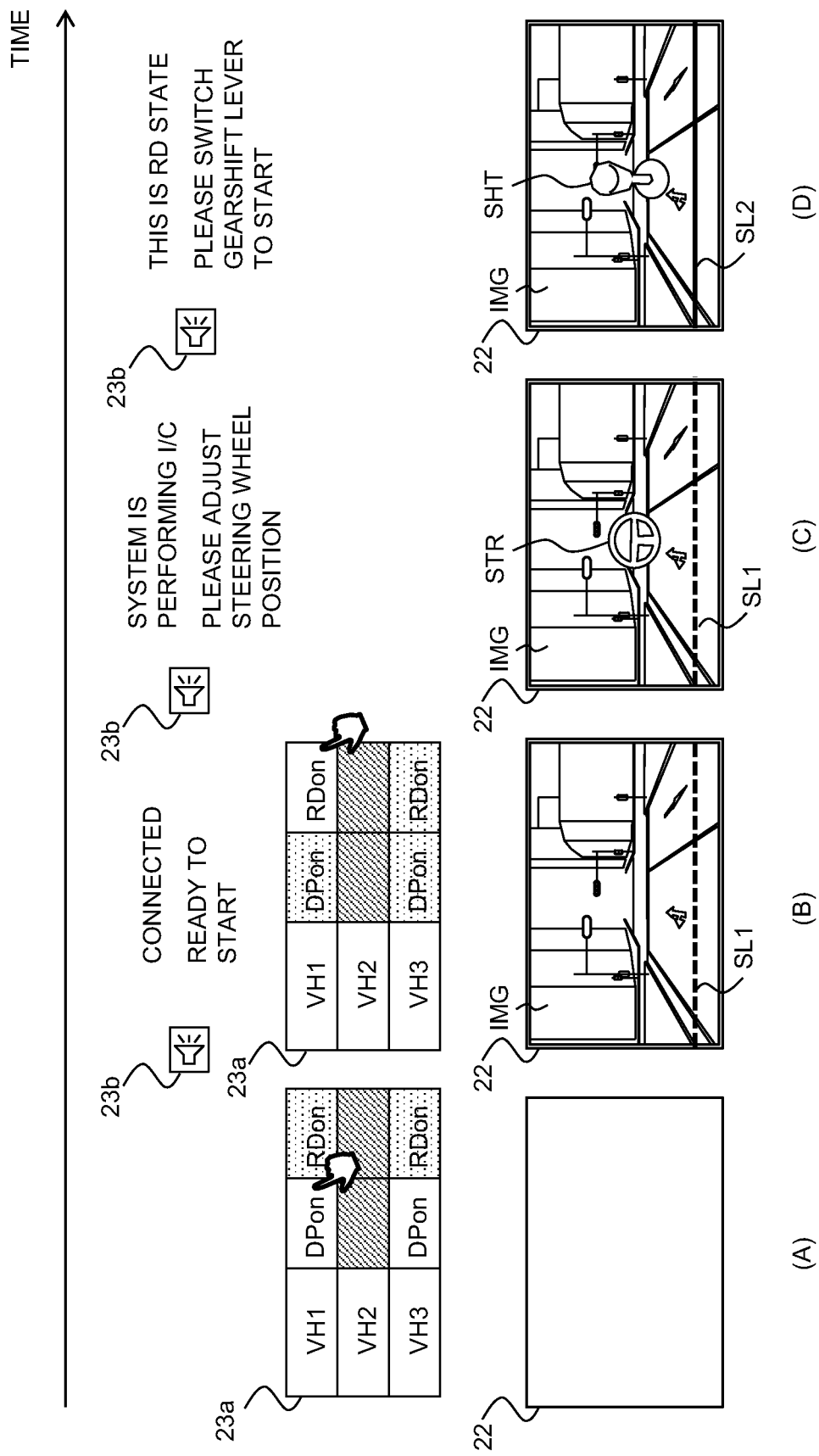
FIG. 3 is a diagram illustrating an example of operations of a remote cockpit performed when an operator performs a remote driving of a vehicle, and output modes of a display and an operator I/F related to the operations.

FIG. 3 is a diagram illustrating an example of operations of the remote cockpit 2 when the operator OP performs the remote driving of the vehicle 1 (a vehicle VH1), and outputting modes of the display 22 and the operator I/F 23 related to the operations. FIG. 3 illustrates four examples of operations performed in chronological order.

In the example shown in FIG. 3, the operator I/F 23 includes a touch panel 23a and a speaker 23b. On the touch panel 23a, vehicle type names of vehicle VH1, VH2, and VH3 are displayed as targets of the remote driving together with images of their vehicle bodies. The "targets of the remote driving" are, for example, vehicles having a contract for a service providing the remote driving. Note that the vehicles VH1, VH2, and VH3 are examples of the targets of the remote driving, and the total number of the targets may be one, two, or four or more.

Among the vehicles VH1, VH2, and VH3, vehicles in which the operator OP can perform the remote driving (e.g., vehicles that transmit an implementation request for the remote driving) are the vehicles VH1 and VH3. Therefore, in the example shown in FIG. 3, rightward touch areas "DPon (Display on)" of regions indicating the vehicle type names of vehicle VH1 and VH3 are displayed with "white backgrounds", whereas the touch area "DPon" of the vehicle VH2 is not displayed (shaded background) (see scene (A) of FIG. 3). In addition, the touch areas "RDon" of the vehicle VH1 and the VH3 are displayed with "dot background". The reason for this is to visually convey to the operator OP that only the touch area "DPon" displayed with the "white background" is selectable.

In the example shown in FIG. 3, the operator OP touches the touch area "DPon" on the rightward of the region where the vehicle type name of vehicle VH1 is displayed to select an implementation of the remote driving of the vehicle VH1. Then, the front image IMG of the vehicle VH1 is output from the display 22 (see scene (B) of FIG. 3). An auxiliary image SL1 represented by a straight line is superimposed on the front image IMG. The auxiliary image SL1 visually notifies the operator OP that the state is a state in which the implementation of the remote driving is permitted. Note that the shape and the superimposed position of the auxiliary image SL1 shown in FIG. 3 are merely examples, and an arbitrary shape and superimposed position can be adopted in accordance with the size, layout, and the like of various images output to the display 22. It is desirable that the auxiliary image SL1 is colored (e.g., blue) in order to increase a transferability to the operator OP.

In the scene (B) of FIG. 3, the touch areas "DPon" of the rightward of the region that indicate the vehicle type names of vehicle VH1 and VH3 are displayed with "dot backgrounds", and the touch area "RDon (Remote Drive on)" of the rightward of the region that indicates the vehicle type name of vehicle VH1 is displayed with a "white background". That is, in the scene (B) of FIG. 3, only the touch area "RDon" displayed with the "white background" is selectable. In this case, sounds such as "connected" and "ready to start" are reproduced from the speaker 23b. The reason for this is to audibly transmit to the operator OP that the remote cockpit 2 and the vehicle VH1 are connected and that the start request for the remote driving of the vehicle VH1 can be made.

The operator OP touches the touch area "RDon" on the rightward of the region that indicates the vehicle type name of the vehicle VH1. When the touch area "RDon" is touched, the start request for the remote driving is generated and transmitted to the remote driving kit 11. Note that, as described above, the state of the remote driving kit 11 transitions from the state 21 "Standby" to the state 22 "RD-Req." when the start request is accepted.

When the touch area "RDon" is touched, the front image IMG in which a steering wheel image STR is superimposed on a center portion thereof is output to the display 22 (see scene (C) of FIG. 3). In this case, speaker 23b reproduces a sound such as "system is performing I/C (Initial Check)", "please adjust steering wheel position" and the like. The reason for this is to prompt an operation of the steering wheel 28 for making the target steering angle $\delta TR$ and the actual steering angle $\delta A$ coincide with each other. In response to this request, the operator OP performs the operation of the steering wheel 28.

Figure 4:
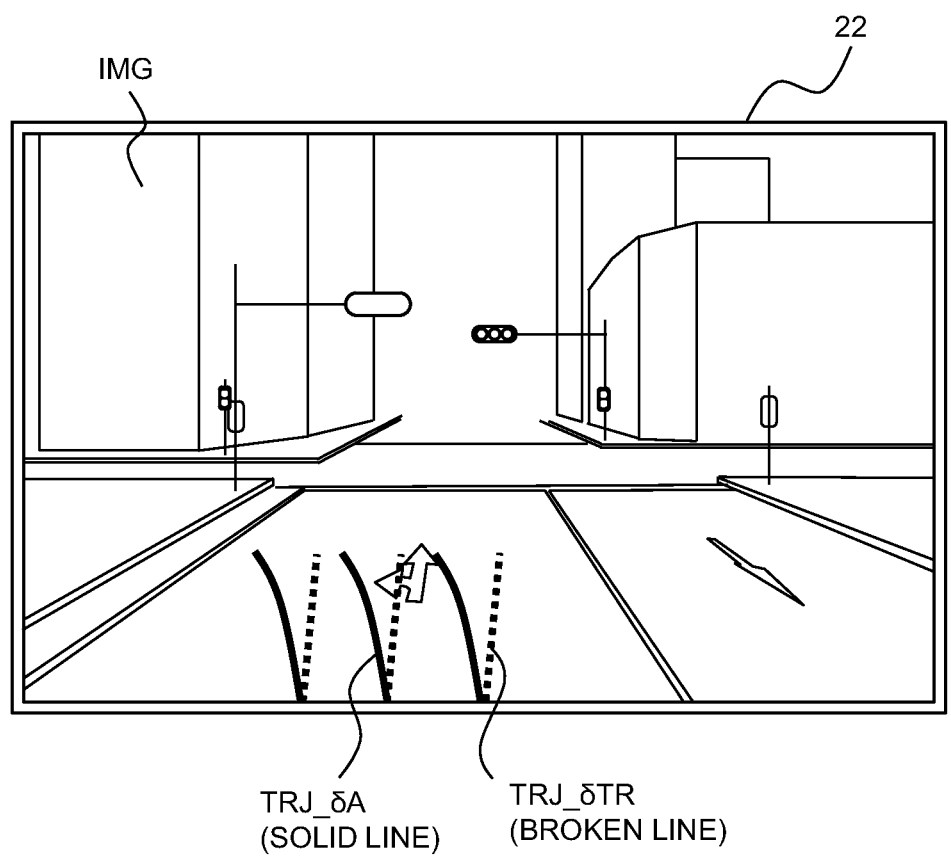
FIG. 4 is a diagram illustrating another example of the front image output to the display to prompt the user to operate the steering wheel.

FIG. 4 is a diagram illustrating another example of the front image IMG output to the display 22 for prompting the operation of the steering wheel 28. In the example shown in the scene (C) of FIG. 3, the steering wheel image STR is superimposed on the center portion of the front image IMG. On the other hand, in the example shown in FIG. 4, trajectory images TRJ_$\delta A$ (solid line) and TR_$\delta TR$ (broken line) indicating two types of predicted trajectories are superimposed on a lower portion of the front image IMG. The trajectory image TRJ_$\delta A$ indicates the predicted trajectory of a vehicle body of the vehicle VH1 when the wheels are steered in accordance with the actual steering angle $\delta A$. On the other hand, the trajectory image TRJ_$\delta TR$ indicates the predicted trajectory of the vehicle body of the vehicle VH1 when the wheels are steered in accordance with the target steering angle $\delta TR$.

When the front image IMG including the trajectory images TRJ_$\delta A$ and TR_$\delta TR$ are output to the display 22, information on a deviation between the actual steering angle $\delta A$ and the target steering angle $\delta TR$ is visually transmitted to the operator OP. Note that the predicted trajectory shown in FIG. 4 is an example, and any image (e.g., two types of steering wheel images STR rotated according to the actual steering angle $\delta A$ and the target steering angle $\delta TR$, respectively) capable of visually transmitting information on the deviation to the operator OP can be superimposed on the front image IMG.

Returning to FIG. 3, the description will be continued. When the target steering angle $\delta TR$ and the actual steering angle $\delta A$ coincide with each other, the front image IMG on which a gearshift image SHT is superimposed instead of the steering wheel image STR is output to the display 22 (see scene (D) of FIG. 3). In this case, the speaker 23b reproduces a sound such as "This is RD state", "Please switch the gearshift lever to start" and the like. This is to notify the operator OP that the start of the remote driving is permitted when the target steering angle $\delta TR$ and the actual steering angle $\delta A$ coincide with each other. In response to this notification, the operator OP operates the gearshift lever 29, the accelerator pedal, or the like.

An auxiliary image SL2 represented by a straight line is superimposed on the front image IMG shown in the scene (D) of FIG. 3. The auxiliary image SL2 visually notifies the operator OP of the state in which the start of the remote driving is permitted. Similar to the auxiliary image SL1, the shape and the overlapping portion of the auxiliary image SL2 may be variously modified. In order to increase the transferability to the operator OP, it is desirable that the shape and the overlapping portion of the auxiliary image SL2 are the same as those of the auxiliary image SL1, and the color of the auxiliary image SL1 is different from that of the auxiliary image SL2 (e.g., green).

3-2. Example of Computer Processing

Figure 5:
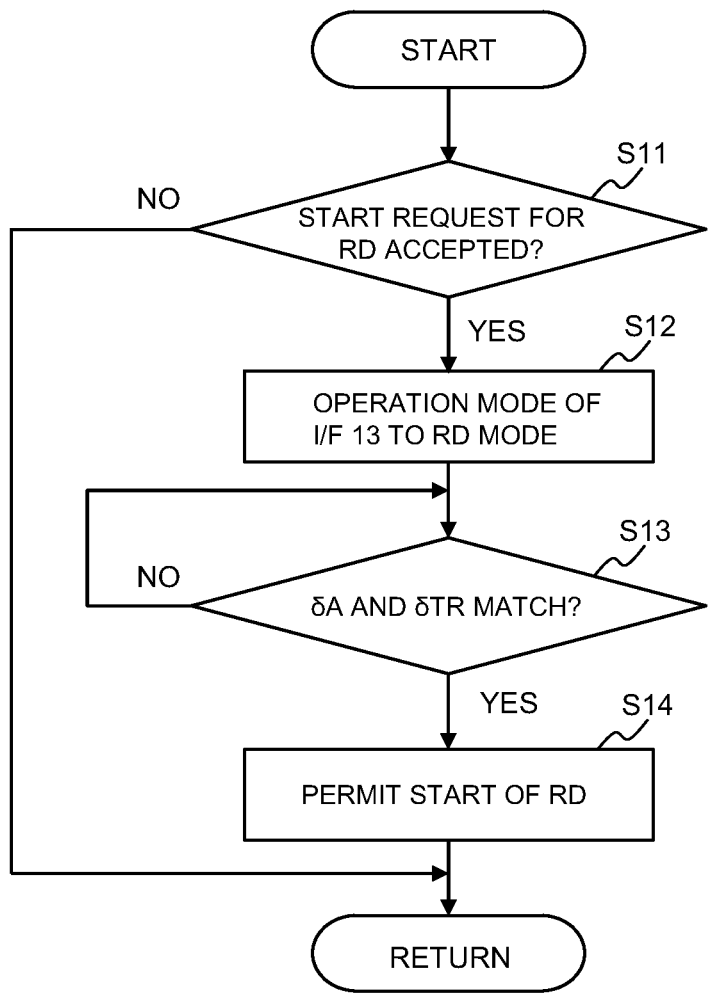
FIG. 5 is a flowchart illustrating a processing example executed by the remote driving kit, which is particularly relevant to an embodiment.
Figure 6:
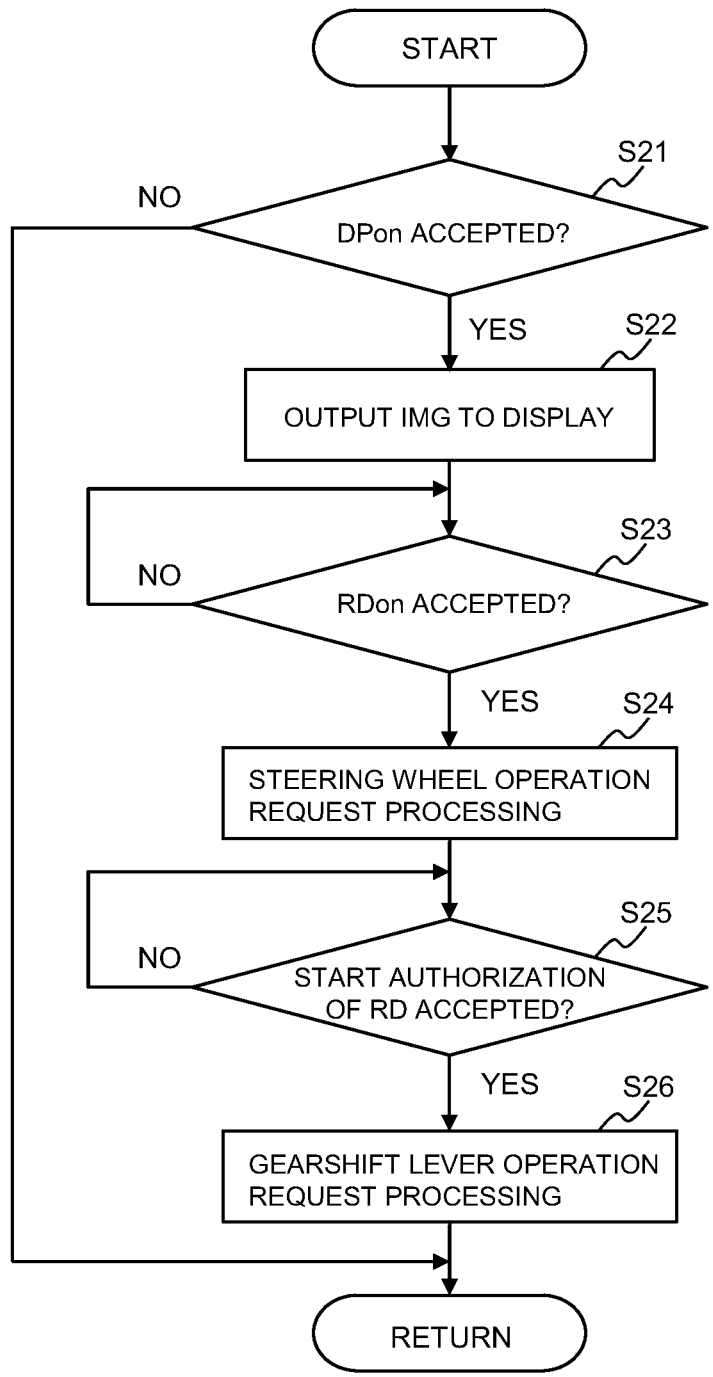
FIG. 6 is a flow chart illustrating a processing example executed by a data processing device, which is particularly relevant to the embodiment.
Figure 7:
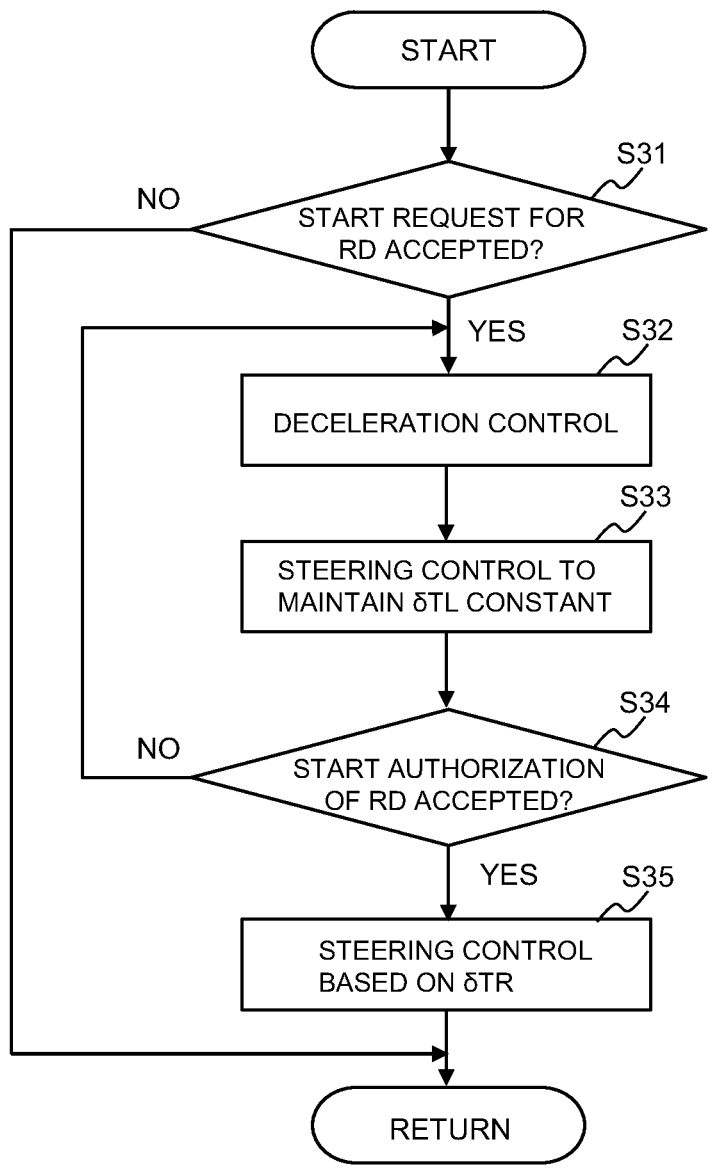
FIG. 7 is a flowchart illustrating a processing example executed by a vehicle control device that is particularly relevant to the embodiment.

Examples of computer processing executed by the vehicle 1 (the vehicle VH1) and the remote cockpit 2 when the four operations described in FIG. 3 are performed by the operator OP will be described with reference to FIGS. 5 to 7. FIG. 5 is a flow chart illustrating an example of processing executed by the remote driving kit 11 (the processor 16) that is particularly relevant to the embodiment. FIG. 6 is a flow chart illustrating an example of processing executed by the data processing device 21 (the processor 26) that is particularly relevant to the embodiment. FIG. 7 is a flow chart illustrating an example of processing executed by the vehicle control device 12 that is particularly relevant to the embodiment.

In the processing routine shown in FIG. 5, it is first determined whether the start request for the remote driving (RD) has been accepted (step S11). As described in FIG. 3, the start request for the remote driving is generated due to the touch operation of the touch area "RDon" and transmitted to the remote driving kit 11. Therefore, when the touch operation of the touch area "RDon" is performed, the remote driving kit 11 accepts the start request for the remote driving. When the determination result of step S11 is negative, the processing routine of FIG. 5 is ended.

When the determination result of step S11 is positive, the operation mode of the vehicle control I/F 13 is switched from the local operation mode to the remote operation mode (step S12). When the processing of step S12 is executed, various data transmitted from the remote cockpit 2 to the remote driving kit 11 is provided to the vehicle control device 12 via the vehicle control I/F 13. In addition, various data from the vehicle control device 12 is provided to the remote cockpit 2 via the vehicle control I/F 13 and the remote driving kit 11.

Following the processing of step S12, it is determined whether or not the actual steering angle δA matches the target steering angle δTR (step S13). Here, "the actual steering angle δA matches the target steering angle δTR" means that a difference between these angles is equal to or less than a threshold. That is, not only when the actual steering angle δA is equal to the target steering angle δTR, but also when there is an allowable difference therebetween, it is determined that the actual steering angle δA and the target steering angle δTR match each other. The processing of step S13 is repeatedly executed until a positive judgment result is obtained.

When the determination result in step S13 is positive, the start of the remote driving is permitted (step S14). As a result, the remote driving including a remote steering of the wheels of the vehicle VH1 based on the target steering angle δTR is started. Note that when the determination result of step S13 is negative, the target steering angle δTR is discarded in the remote driving kit 11. In the processing of step S14, a start authorization of the remote driving is generated and transmitted to the vehicle control device 12 and the remote cockpit 2.

In the processing routine shown in FIG. 6, it is first determined whether the ON information (DPon information) of the display 22 has been accepted (step S21). When the touch operation of the touch area "DPon" described in FIG. 3 is performed, the ON information of the display 22 is generated. Therefore, when the touch operation is performed, the data processing device 21 accepts the ON information of the display 22. When the determination result of step S21 is negative, the processing routine of FIG. 6 is ended.

When the determination result of step S21 is positive, at least the front image of the vehicle VH1 is output to the display 22 (step S22). The touch area "DPon" described in FIG. 3 corresponds to the one referring the vehicle VH1. Therefore, at least the front image of the vehicle VH1 is output to the display 22.

Following the processing of step S22, it is determined whether the ON information (RDon information) of the remote driving has been accepted (step S23). The ON information of the remote driving is generated when the touch operation of the touch area "RDon" described in FIG. 3 is performed. When the touch operation of the touch area "RDon" is performed, the start request for the remote driving to be transmitted to the remote driving kit 11 is also generated. Therefore, in the processing of step S23, the start request for the remote driving may be used instead of the ON information of remote driving. The processing of step S23 is repeatedly executed until a positive judgment result is obtained.

When the determination result in step S23 is positive, a steering wheel operation request processing is executed (step S24). Examples of the request processing include processing to superimpose the steering wheel image STR on the front image of the vehicle VH1 output to the display 22. The request processing includes the reproduction of the sound such as "system is performing I/C" and "please adjust steering wheel position".

Following the processing of step S24, it is determined whether the start authorization of the remote driving has been accepted (step S25). As described in the description of step S14 in FIG. 5, when it is determined that the actual steering angle δA matches the target steering angle δTR, the start authorization of the remote driving is generated and transmitted to the remote cockpit 2. Therefore, when it is determined that the actual steering angle δA matches the target steering angle δTR, the remote cockpit 2 accepts the start authorization of the remote driving. The processing of step S25 is repeatedly executed until a positive judgment result is obtained.

When the determination result in step S25 is positive, a gearshift lever operation request processing is executed (step S26). Examples of the request processing include processing to superimpose the gearshift image SHT on the front image of the vehicle VH1 output to the display 22. The request processing also includes the reproduction of sound such as "please switch the gearshift lever and start".

In the processing routine shown in FIG. 7, it is first determined whether the start request for the remote driving has been accepted (step S31). The content of the processing in step S31 is the same as that in step S11 in FIG. 5. When the determination result of step S31 is negative, the processing routine of FIG. 7 is terminated.

When the determination result of step S31 is positive, the vehicle VH1 is subjected to the deceleration control (step S32). In addition, the steering control is executed in which the target steering angle δTL of the wheels of the vehicle VH1 is maintained constant (step S33). The processing of steps S32 and S33 is executed to prevent a situation in which it is difficult to switch from the local driving to the remote driving.

In the deceleration control of the step S32, for example, even if the accelerator pedal of the vehicle VH1 is operated by the driver, the target acceleration based on the operation amount is changed to the target deceleration (i.e., sign is reversed), and the brake device of the vehicle VH1 is controlled. In another example, the brake device of the vehicle VH1 is controlled based on a preset target deceleration. In the steering control of step S33, for example, the actual steering angle δA at which the determination result of step S31 is determined to be positive is set to the target steering angle δTL, and the wheels are steered based on the target steering angle δTL.

Following the processing of step S33, it is determined whether the start authorization of the remote driving has been accepted (step S34). As described in the description of step S14 in FIG. 5, when it is determined that the actual steering angle δA matches the target steering angle δTR, the start authorization of the remote driving is generated and transmitted to the vehicle control device 12. Therefore, when it is determined that the actual steering angle δA matches the target steering angle δTR, the vehicle control device 12 accepts the start authorization of the remote driving. When the determination result in step S34 is negative, the processing in step S32 is executed. That is, the processing of steps S32 to S34 is repeatedly executed until a positive judgment result is obtained in step S34.

When the determination result of step S34 is positive, the steering control of the wheels of vehicle VH1 based on the target steering angle δTR is executed (step S35). When the processing of step S35 is executed, the remote driving including the remote steering of the wheels of vehicle VH1 based on the target steering angle δTR is started.

4. Example to End Remote Driving 4-1. Outline

Figure 8:
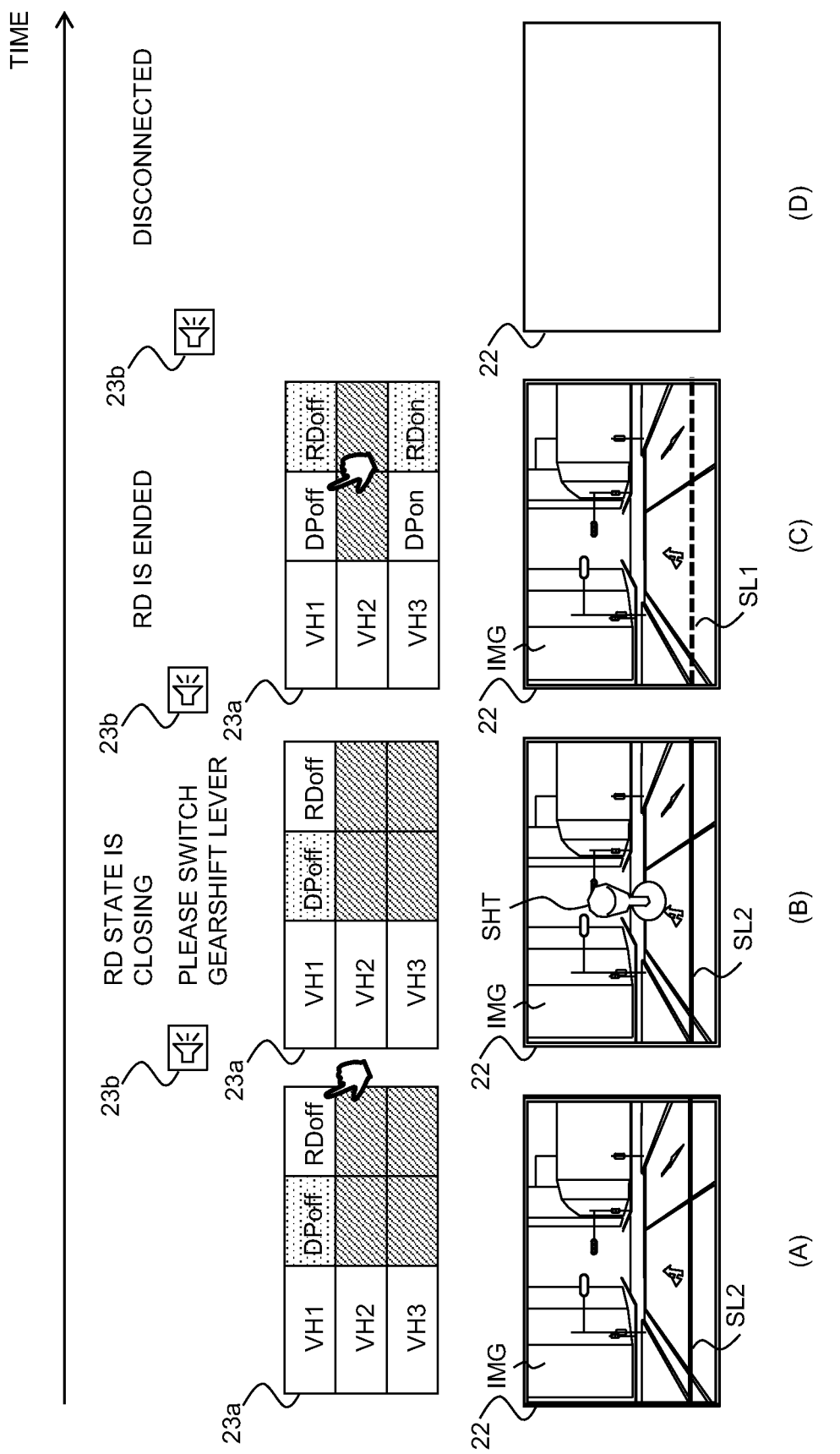
FIG. 8 is a diagram illustrating an example of operations of the remote cockpit performed when the operator ends the remote driving of the vehicle, and output modes of the display and the operator I/F related to these operations.

FIG. 8 is a diagram showing an example of operations of the remote cockpit 2 when the operator OP ends the remote driving of the vehicle 1 (the vehicle VH1), and outputting modes of the display 22 and the operator I/F 23 related to these operations. FIG. 8 illustrates three examples of operations performed in chronological order.

When ending the remote driving of the vehicle VH1, the operator OP touches a touch area "RDoff" in the rightward direction of the region where the vehicle type name of the vehicle VH1 is displayed (see scene (A) of FIG. 8). In the scene (A) of FIG. 8, only the touch area "RDoff" on the right side of the region that indicates the vehicle type name of vehicle VH1 is displayed with the "white background", and the other touch areas are displayed with the "dot background" or are not displayed (the shaded background). The reason for this is to visually convey to the operator OP that only the touch area "RDoff" displayed with the "white background" is selectable.

When the touch area "RDoff" is touched, a finish request for the remote driving is generated and transmitted to the remote driving kit 11. When the finish request is accepted, the state of the remote driving kit 11 shifts from the state 32 "Drive" to the state 33 "LD-Req." as described above.

When the touch area "RDoff" is touched, the front image IMG in which the gearshift image SHT is superimposed on the center portion thereof is output to the display 22 (see scene (B) of FIG. 8). In this case, the speaker 23b reproduces a sound such as "RD state is closing" and "please switch the gearshift lever". The reason for this is that if the gearshift lever 29 is at a position other than an end position (e.g., a Parking position), the vehicle 1 will move forward at the start authorization of the next remote driving. Therefore, if the position of the gearshift lever 29 is not at the end position when the finish request for the remote driving is generated, the operation of the gearshift lever 29 is prompted.

When it is confirmed that the position of the gearshift lever 29 is at the end position, the touch area "DPoff" on the right side of the area that indicates where the vehicle type name of the vehicle VH1 is displayed becomes selectable (see scene (C) of FIG. 8). In this case, the speaker 23b reproduces a sound such as "RD state is ended". Note that the auxiliary image SL1 is superimposed on the front image IMG shown in the scene (C) of FIG. 8. As described above, the auxiliary image SL1 visually notifies the operator OP that the state is a state in which the implementation of the remote driving is permitted (i.e., the state is not a state in which the start of remote driving is permitted).

When the touch area "DPoff" is touched, the display 22 is turned off. In this case, a sound such as "disconnected" is reproduced from the speaker 23b (see scene (D) of FIG. 8). The reason for this is to audibly notify the operator OP that the connection between the remote cockpit 2 and the vehicle VH1 has been disconnected.

4-2. Example of Computer Processing

Figure 9:
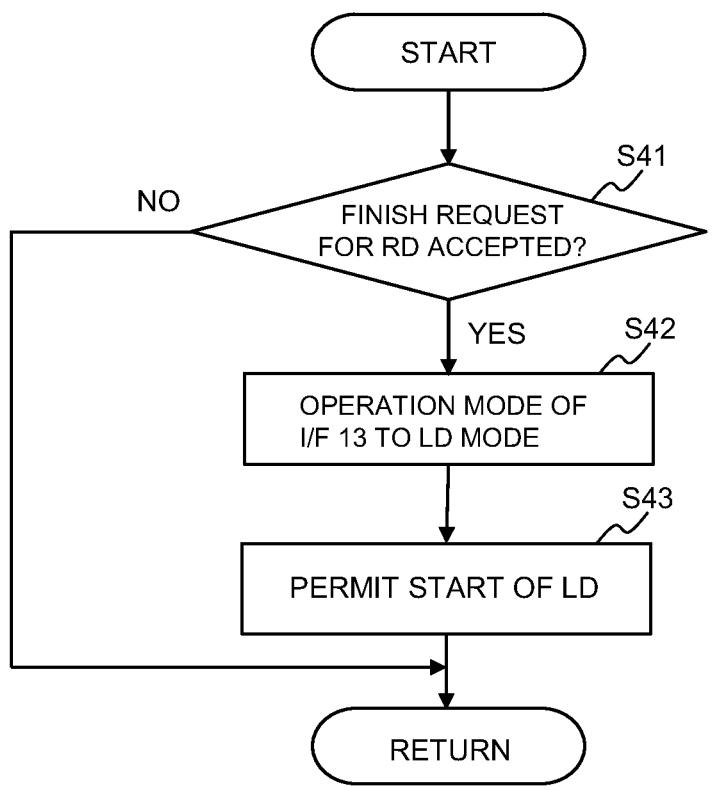
FIG. 9 is a flowchart illustrating a processing example executed by the remote driving kit, which is particularly relevant to the embodiment.
Figure 10:
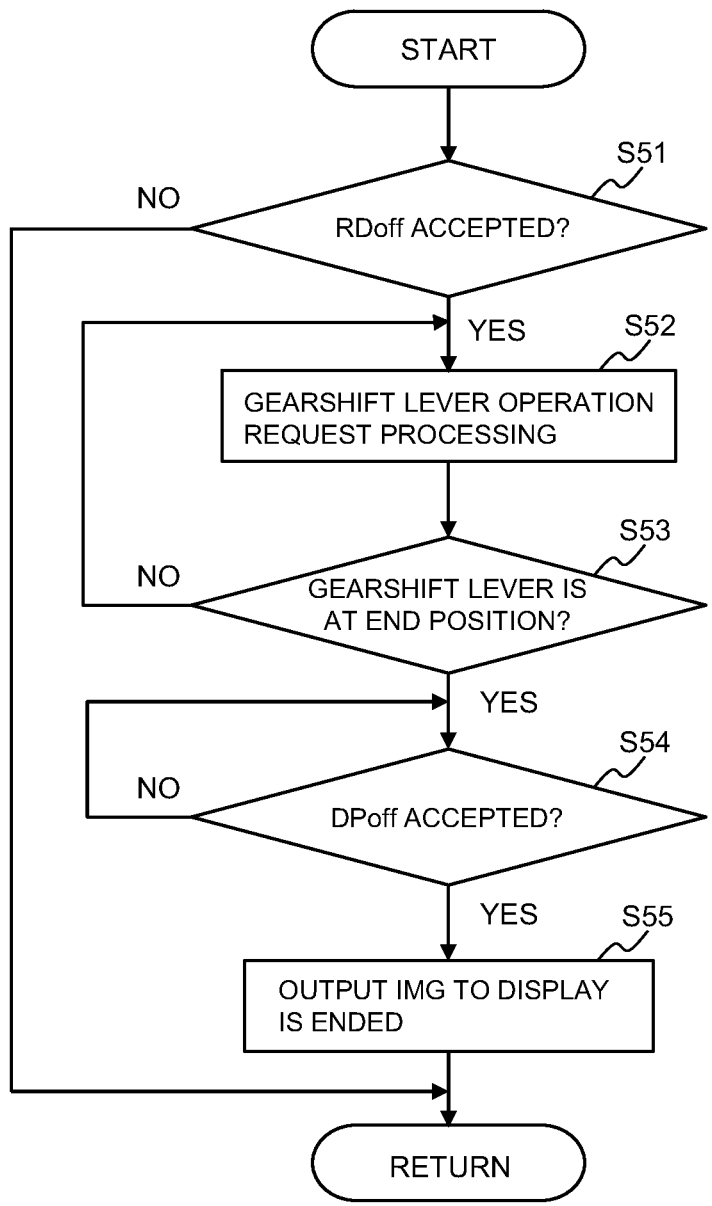
FIG. 10 is a flowchart illustrating an example processing executed by the data processing device that is particularly relevant to the embodiment.

Examples of computer processing executed in the vehicle 1 (the vehicle VH1) and the remote cockpit 2 when the three operations described in FIG. 8 are performed by the operator OP will be described with reference to FIGS. 9 and 10. FIG. 9 is a flow chart illustrating an example of processing executed by the remote driving kit 11 (the processor 16) that is particularly relevant to the embodiment. FIG. 10 is a flow chart illustrating an example of processing executed by the data processing device 21 (the processor 26), that is particularly relevant to the embodiment.

In the processing routine shown in FIG. 9, it is first determined whether the finish request for the remote driving has been accepted (step S41). As described in FIG. 8, the finish request for the remote driving is generated due to the touch operation of the touch area "RDoff" and is transmitted to the remote driving kit 11. Therefore, when the touch operation of the touch area "RDoff" is performed, the remote driving kit 11 accepts the finish request for the remote driving. When the determination result of step S41 is negative, the processing routine of FIG. 9 ends.

When the determination result in step S41 is positive, the operation mode of the vehicle control I/F 13 is switched from the remote operation mode to the local operation mode (step S42). When the processing of step S42 is performed, provision of various data from the remote cockpit 2 to the vehicle control device 12 via the remote driving kit 11 and the vehicle control I/F 13 is ended.

Following the processing of step S42, a start of the local driving (LD) is permitted (step S43). Accordingly, the local driving including a local steering of the wheels of the vehicle VH1 based on the target steering angle δTL is started.

In the processing routine shown in FIG. 10, it is first determined whether the OFF information (RDoff information) of the remote driving has been accepted (step S51). The OFF information of the remote driving is generated when the touch operation of the touch area "RDoff" described in FIG. 8 is performed. When the touch operation of the touch area "RDoff" is performed, the finish request for the remote driving to be transmitted to the remote driving kit 11 is also generated. Therefore, in the processing in step S51, the finish request for the remote driving may be used instead of the OFF information of the remote driving. When the determination result of step S51 is negative, the processing routine of FIG. 10 ends.

When the determination result in step S51 is positive, a gearshift lever operation request processing is executed (step S52). Examples of the request processing include processing to superimpose the gearshift image SHT on the front image of the vehicle VH1 output to the display 22. The request processing includes the reproduction of sound such as "please switch the gearshift lever".

Following the processing of step S52, it is determined whether the gearshift lever 29 is at the end position (step S53). When the determination result in step S53 is negative, the processing of step S52 is executed. That is, the processing of steps S52 and S53 are repeatedly executed until a positive judgment result is obtained in step S53.

When the determination result in step S53 is positive, it is determined whether the OFF information (DPoff information) of the display 22 has been accepted (step S54). When the touch operation of the touch area "DPoff" described in FIG. 8 is performed, the OFF information of the display 22 is generated. Therefore, when the touch operation is performed, the data processing device 21 accepts the OFF information of the display 22. The processing of step S54 is repeatedly executed until a positive judgment result is obtained.

When the determination result of step S54 is positive, the output of the front image IMG of vehicle VH1 from the display 22 is ended (step S55).

What is claimed is:

1. A method for performing remote driving of a mobile vehicle having wheels, the method comprising the steps of:
   accepting a start request for the remote driving;
   acquiring information on a target steering angle of the wheels generated in a remote driving device and information on an actual steering angle of the wheels;
   before permitting a start of the remote driving after accepting the start request, determining a difference between the target steering angle and the actual steering angle; and
   based upon the determination that the difference between the target steering angle and the actual steering angle is less than a threshold, permitting the start of the remote driving including a remote steering of the wheels based on the target steering angle.

2. The method according to claim 1,
   wherein based upon the determination that the difference between the target steering angle and the actual steering angle is less than the threshold before the permitting the start of the remote driving, the method further comprising the step of prompting an alignment operation of a steering member of the remote driving device after the acceptance of the start request and before the permission of the start of the remote driving.

3. The method according to claim 2,
   wherein the step of prompting the alignment operation comprises the step of outputting information on a deviation between the target steering angle and the actual steering angle to a display included in the remote driving device.

4. The method according to claim 1,
   wherein the start request is generated based on an operation of an operator interface included in the remote driving device.

5. The method according to claim 1,
   wherein the information on the target steering angle is discarded in the mobile vehicle after the acceptance of the start request and before the permission of the start of the remote driving.

6. The method according to claim 1,
   wherein a local steering of the wheels in which the target steering angle of the wheels generated in the mobile vehicle is maintained at a constant angle is performed after the acceptance of the start request and before the permission of the start of the remote driving.

7. The method according to claim 1,
   wherein a local driving that decelerates the mobile vehicle is performed after the acceptance of the start request and before the permission of the start of the remote driving.

8. The method according to claim 1,
   wherein an operation mode of an interface connecting the remote driving device and a driving controller of the mobile vehicle is switched from a local operation mode to a remote operation mode after the acceptance of the start request and before the permission of the start of the remote driving.

9. The method according to claim 1,
   wherein the method further comprising the step of outputting information on a state of the remote driving to a display included in the remote driving device,
   wherein the state of the remote driving includes an unauthorized state indicating a state before the permission of the start of the remote driving and an authorized state indicating a state after the permission of the start of the remote driving,
   wherein an output mode of the authorized state output to the display is different from that of the unauthorized state.

10. The method according to claim 1,
    wherein the method further comprises the step of outputting a front image of the mobile vehicle on a display included in the remote driving device,
    wherein the front image of the mobile vehicle is output from the display before the acceptance of the start request.

11. The method according to claim 1,
    wherein the method further comprises step of prompting to operate a shift-change member of the remote driving device after the permission of the start of the remote driving.

12. The method according to claim 1,
    wherein the method further comprises the steps of:
    accepting a finish request for the remote driving;
    permitting a termination of the remote driving when a position of a shift-change member of the remote driving device is a stop position in a case where the finish request is accepted; and
    prompting to operate the shift-change member when the position of the shift-change member is not at the stop position in a case where the finish request is accepted.

13. A device for performing remote driving of a mobile vehicle having wheels, the device comprising a processor,
    wherein the processor is configured to execute processing to:
    accept a start request for the remote driving;
    acquire information on a target steering angle of the wheels generated in the remote driving device and information on an actual steering angle of the wheels;
    before permitting a start of the remote driving after accepting the start request, determine a difference between the target steering angle and the actual steering angle; and based upon the determination that the difference between the target steering angle and the actual steering angle is less than a threshold, permit the start of the remote driving including a remote steering of the wheels based on the target steering angle.

14. A non-transitory computer-readable medium storing a program for performing a remote driving of a mobile vehicle having wheels, the program causes a computer to execute processing to:
accept a start request for the remote driving;
acquire information on a target steering angle of the wheels generated in a demote driving device and information on an actual steering angle of the wheels;
before permitting a start of the remote driving after accepting the start request, determine a difference between the target steering angle and the actual steering angle; and
based upon the determination that the difference between the target steering angle and the actual steering angle is less than a threshold, permit the start of the remote driving including a remote steering of the wheels based on the target steering angle.

15. The method according to claim 1,
wherein the method further comprises the steps of:
based upon a determination that the difference between the target steering angle and the actual steering angle is less than the threshold, determining that the target steering angle and the actual steering angle match;
based upon the determination that the difference between the target steering angle and the actual steering angle is equal to or more than the threshold, determining that the target steering angle and the actual steering angle do not match; and
based upon the determination that the target steering angle and the actual steering angle do not match, performing an operation to match the target steering angle and the actual steering angle before permitting the start of the remote driving,
wherein the start of the remote driving including the remote steering of the wheels based on the target steering angle is permitted based upon the determination that the target steering angle and the actual steering angle match.

16. The device according to claim 13,
wherein the processor is further configured to execute processing to:
based upon a determination that the difference between the target steering angle and the actual steering angle is less than the threshold, determine that the target steering angle and the actual steering angle match;
based upon the determination that the difference between target steering angle and the actual steering angle is equal to or more than the threshold, determine that the target steering angle and the actual steering angle do not match; and
based upon the determination that the target steering angle and the actual steering angle do not match, perform an operation to match the target steering angle and the actual steering angle before permitting the start of the remote driving,
wherein the start of the remote driving including the remote steering of the wheels based on the target steering angle is permitted based upon the determination that the target steering angle and the actual steering angle match.

17. The non-transitory computer-readable medium according to claim 14,
wherein the program further causes a computer to execute processing to:
based upon a determination that the difference between the target steering angle and the actual steering angle is less than the threshold, determine that the target steering angle and the actual steering angle match;
based upon the determination that the difference between target steering angle and the actual steering angle is equal to or more than the threshold, determine that the target steering angle and the actual steering angle do not match; and
based upon the determination that the target steering angle and the actual steering angle do not match, perform an operation to match the target steering angle and the actual steering angle before permitting the start of the remote driving,
wherein the start of the remote driving including the remote steering of the wheels based on the target steering angle is permitted based upon the determination that the target steering angle and the actual steering angle match.

* * * * *